(12) United States Patent
Wood

(10) Patent No.: US 11,477,944 B2
(45) Date of Patent: Oct. 25, 2022

(54) CLUTCH SYSTEM FOR TWIN BALER

(71) Applicant: Wallace Wood, Dayton, OR (US)

(72) Inventor: Wallace Wood, Dayton, OR (US)

(*) Notice: Subject to any disclaimer, the term of this patent is extended or adjusted under 35 U.S.C. 154(b) by 0 days.

(21) Appl. No.: 17/704,932

(22) Filed: Mar. 25, 2022

(65) Prior Publication Data
US 2022/0304241 A1   Sep. 29, 2022

Related U.S. Application Data

(60) Provisional application No. 63/166,721, filed on Mar. 26, 2021.

(51) Int. Cl.
| *A01F 15/04* | (2006.01) |
| *A01F 15/14* | (2006.01) |
| *A01D 59/04* | (2006.01) |
| A01F 15/08 | (2006.01) |

(52) U.S. Cl.
CPC ............ *A01F 15/145* (2013.01); *A01D 59/04* (2013.01); *A01F 15/04* (2013.01); *A01F 2015/0866* (2013.01)

(58) Field of Classification Search
CPC .... A01F 15/04; A01F 15/145; A01F 15/0858; A01F 2015/0866; A01D 59/04
See application file for complete search history.

(56) References Cited

U.S. PATENT DOCUMENTS

| 2,879,709 A | * | 3/1959 | Nelson ............... A01F 15/0858 |
| | | | 192/26 |
| 5,156,085 A | * | 10/1992 | Bossche ............. A01F 15/0858 |
| | | | 100/189 |
| 2015/0097370 A1 | * | 4/2015 | Schumacher ......... A01F 15/145 |
| | | | 289/1.5 |

FOREIGN PATENT DOCUMENTS

| DE | 202004006991 U1 * | 7/2005 | ......... A01F 15/0858 |
| WO | WO-03071858 A1 * | 9/2003 | ......... A01F 15/0858 |

* cited by examiner

*Primary Examiner* — Jimmy T Nguyen
(74) *Attorney, Agent, or Firm* — Chernoff, Vilhauer, McClung & Stenzel, LLP

(57) ABSTRACT

A clutch system for use with an agricultural baler to create a single hay bale that is easily separable into two or more smaller, lighter bales that remain tied after separation is provided herein. The clutch system controls the center knotter of a three-tie baler to be activated every other time the other two knotters are activated to tie two 2'×2' bales into a single 2'×4' bale. The two 2'×2' bales are individually tied so that if a user separates the 2'×4' bale, the smaller bales remain intact.

1 Claim, 8 Drawing Sheets

CLUTCH SYSTEM FOR TWIN BALER

CROSS-REFERENCES TO RELATED APPLICATIONS

This application claims the benefit of U.S. Provisional Application Ser. No. 63/166,721 filed on Mar. 26, 2021, and entitled "VARIABLE BALE SIZE BALER." The complete disclosure of the above application is hereby incorporated by reference for all purposes.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

SEQUENCE LISTING

Not Applicable

FIELD OF THE INVENTION

The present invention generally relates to hay balers and, more specifically, to a bale capable of producing a bale that is tied to be easily separable into two or more smaller bales that remain independently tied after separation.

BACKGROUND OF THE INVENTION

A baler is a piece of farm equipment used to compress cut cropped material, such as hay, straw, cotton, etc., into compact bales for handling, transport, and storage. A variety of balers are commonly available for producing cylindrical or rectangular bales of various sizes bound with twine, strapping, netting, or wire.

Rectangular bales are easier to handle and transport compared to round bales, because they inherently resist rolling and can be easily stacked for transport and storage, and group baled by a group baler. In the use of a group baler, which is often referred to as a bundler or a grouper, bales are packed into the group baler in a predetermined pattern. After a predetermined number of bales are packed into the group baler, the bales are bound together, such as by twine, netting, wire, plastic strapping, or steel strapping, into a group bale, which is then deposited onto the field.

Agricultural harvesting machines, such as balers, are used to consolidate and package crop material to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber, which is then transferred to a main bale chamber. (For purposes of discussion, the charge of crop material within the pre-compression chamber will be termed a "wad", and the charge of crop material a footer being compressed within the main bale chamber will be termed a "flake"). Typically, such a packer unit includes packer tines or forks to move the crop material from the pickup unit into the pre-compression chamber. A packer unit is also known to use a rotor cutter unit, which chops the crop material into smaller pieces.

A stuffer unit transfers the wad of crop material in charges from the pre-compression chamber to the main bale chamber. Typically, such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers, which extend laterally outward from the sides of the plunger. The rollers on each side of the plunger are received within a respective plunger slot formed in the sidewalls of the bale chamber, with the plunger slots guiding the plunger during the reciprocating movements.

When enough flakes have been added and the bale reaches a full (or other predetermined) size, a number of knotters are actuated which wrap and tie twine, cord or the likearound the bale while it is still in the main bale chamber. The twine is cut and the formed baled is ejected out the back of the baler as a new bale is formed.

As a field is completed, the rearmost formed bale in the baler may need to be ejected prior to leaving the field, so that the bale will not later unintentionally leave the baler and to lighten the load carried by the baler. In some baler arrangements, the ejection arrangement can move all bales which are in the baling chamber in the direction of the outlet of the baling chamber by means of a shuttle assembly and a number of dogs. When the shuttle assembly moves, the dogs will protrude in or behind the bale above it, and will push the bale out of the bale chamber when the shuttle assembly moves from the inlet of the baling chamber towards the outlet of the baling chamber. When using this type of baler ejection arrangement, all formed bales will be ejected out of the baling chamber. Although in some conditions, such as after the harvesting season, completely emptying the baling chamber is not always wanted, because it will be more difficult to produce good quality bales with an empty baling chamber. That way, the first three or four formed bales will need to be cut open and re-baled since the required density of the baled material is often not reached.

A typical bate dimension formed by known small square balers is 14"×18"×48", with the bale weighing from 70-80 lbs. and being bound by two strands of twine, while a typical bale dimension produced by a large square baler is 4'×4'×8', with the bale weighing in the neighborhood of 2000 lbs. and being bound by six strands of twine. It follows then that one drawback of producing small square bales is that the capacity is relatively low as compared to the capacity of a large square baler. However, one drawback of producing large square bales is the weight of the large bales makes handling without specialized, expensive equipment, nearly impossible.

Thus, the problem to be solved is that of constructing a baler for making variable sized bales that have the capacity of larger bales but can be separated into easier-to-handle bales should a user desire the smaller sized bales.

BRIEF SUMMARY OF THE INVENTION

In accordance with an aspect of the present invention, there is provided an agricultural baler with a unique knotting system that can create a single hay bale that is easily separable into two or more smaller, lighter bales that remain tied after separation.

In accordance with another aspect of the present invention, there is provided an agricultural baler including a main bale chamber, needles, knotters, a triggering system, and an ejection arrangement. The needles are coupled to the main bale chamber, and thread twine around a formed bale. The knotters receive the twine from the needles and tie the twine. The triggering system activates the needles and the knotters. A countershaft is installed to operate the center knotter on a three-tie bailer, the center knotter being activated every other time the outside knotters are activated. The center knotter is energized by a clutch mechanism when activated.

In an embodiment of the present invention. the baler is able to combine 2'×2' bales into a single 2'×4' bale.

A further understanding of the present invention can be obtained by reference to a preferred embodiment set forth in the accompanying Description. Although the illustrated embodiments are merely exemplary of apparatus or methods for carrying out the present invention, both the organization and method of operation of the invention, in general, together with further objectives and advantages thereof, may be more easily understood by reference to the illustrations and the following Description. The Figures are not intended to limit the scope of this invention, but merely to clarify and exemplify the invention.

DETAILED DESCRIPTION OF THE INVENTION

In the following detailed Description, reference is made to specific embodiments in which the invention may be practiced. These embodiments are described in sufficient detail to enable those skilled in the art to practice the invention. It is to be understood that the various embodiments of the invention, although different, are not necessarily mutually exclusive.

Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed Description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method, system, and apparatus include the discussed feature, advantage or mode of operation. The following Description of the preferred embodiment is merely exemplary in nature and is in no way intended to limit the invention, its application, or use.

There has thus been broadly outlined the more important features of the invention in order that the detailed Description thereof that follows may be better understood, and in order that the present contribution to the art may be better appreciated. There are, of course, additional features of the invention that will be described herein a footer and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

Figure 1:
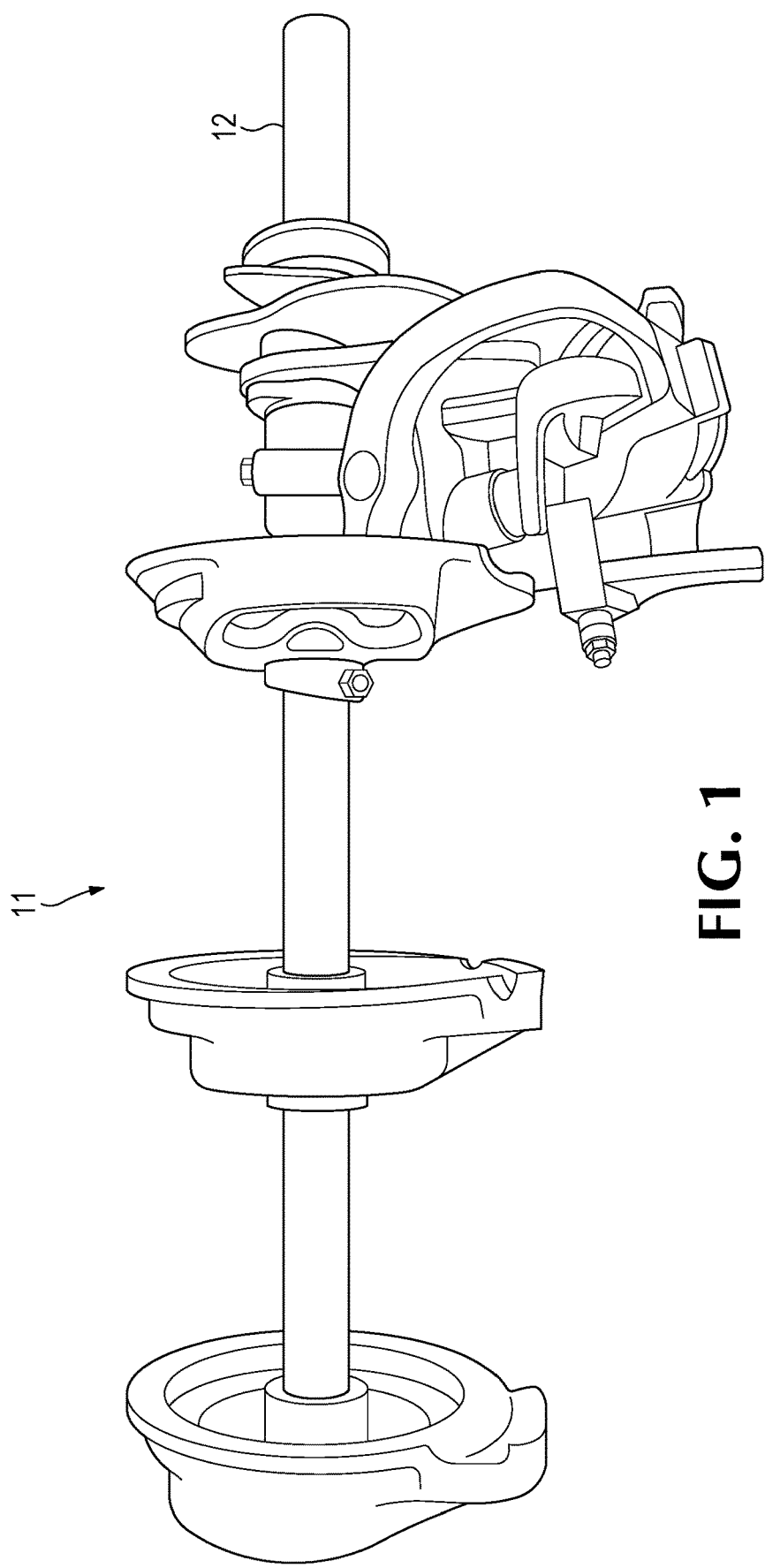
FIG. 1 is a photograph of knotter shaft of a baler used with the clutch system of the present disclosure.

Referring now to FIG. 1, there is shown a known knotter shaft 12 for use with a baler. The disclosure herein teaches a clutch system 10 to be used with such a known knotter shaft of a baler for a unique knotting system for combining 2'×2' bales into a single, larger, 2'×4' bale.

An embodiment of the present invention provides a three-tie baler with two outside knotters and a center knotter. The center knotter is connected to a countershaft and clutch that cause the center knotter to be activated every other time the two outside knotters are activated.

An embodiment of the present invention is designed to be installed on existing three-tie balers as an aftermarket kit. The invention adapts a baler that bales 2'×4' bales to tie 2'×2' bales. Generally, the 2'×4' bales weigh about 100 lbs. and the 2'×2' bales weigh about 50 lbs.

Mechanical equipment then can be used to pick up bales out of the field in 3- or 4-ton block stacks. Then, loaded on trucks and transported to hay sheds or set off at retail markets for resale with no hand labor.

The 2'×2' bales would be tied with outside twine and then incorporated into 2'×4' bale held by the center twine of the knotter with all bales tied together making a solid package. By cutting the center twine on the 2'×4' bales would separate into 2'×2' bales making it easier for users to manually handle the smaller bales.

Figure 2:
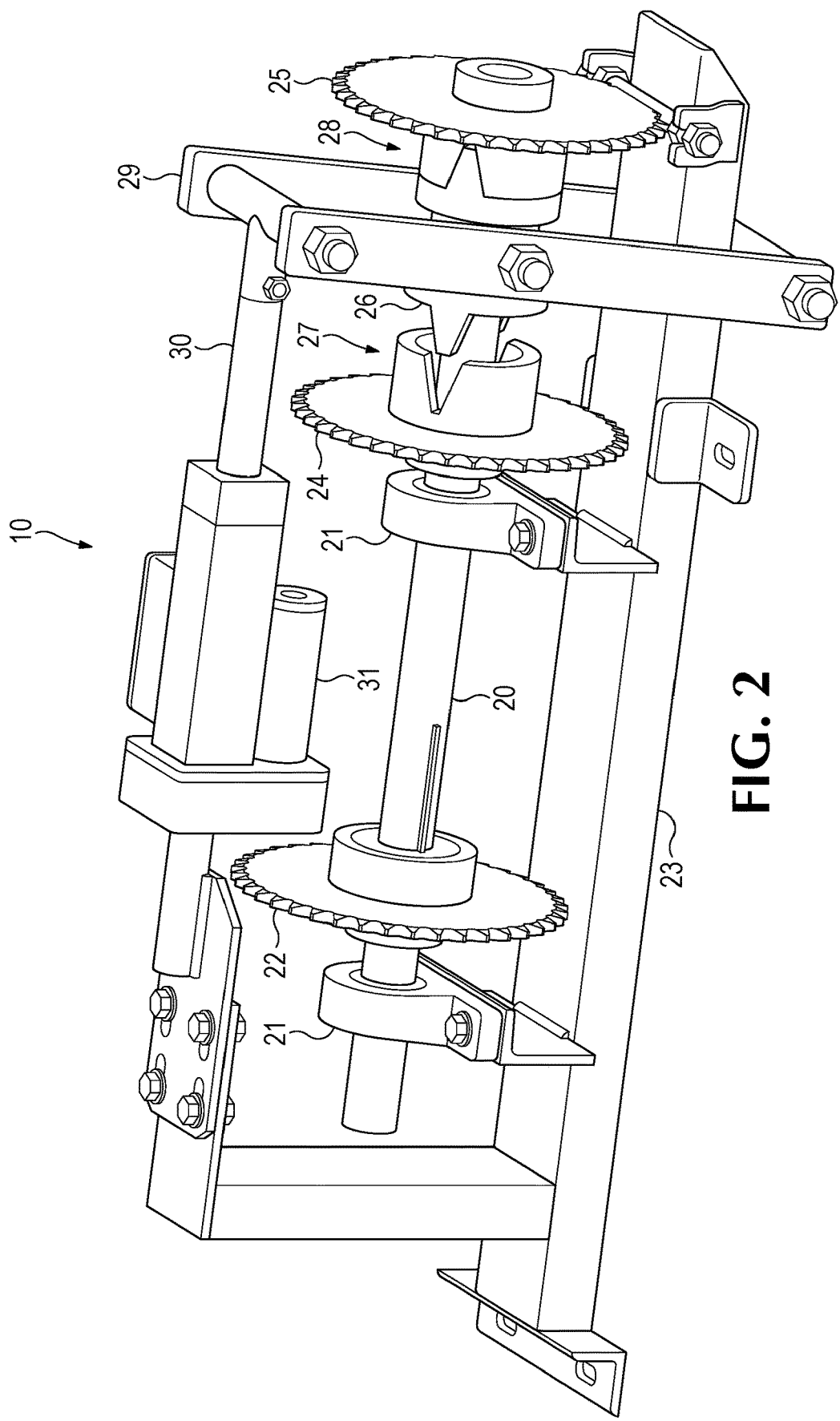
FIG. 2 is the clutch system of the present disclosure.

An embodiment of the present invention ties 2'×2' bales into a 2'×4' bale by a clutch mechanism 10 installed to operate the center knotter 11 on the three-tie baler. The clutch mechanism 10 is shown in FIG. 2. Blocks 21 hold the countershaft 20 in place. Center knotter sprocket 22 carries a chain (not shown) to the center tie knotter 11. The center knotter sprocket 22 is keyed to the countershaft 20. Collar 23 holds drive sprocket 24 in linear location along the countershaft 20. Drive sprocket 24 carries chain (not shown) to the knotter main shaft 12. Brake sprocket 25 in the embodiment of FIG. 2 is physically identical to the drive sprocket 24 for ease of manufacture and consistency in engaging with taper tooth gear 26.

Taper tooth gear 26 is capable of sliding between a sprocket position 27 and a brake position 28. Taper tooth gear 26 is mechanically linked to pivot fork 29, which pivots in response to movement by linear actuator 30 driven by motor 31.

Figure 3:
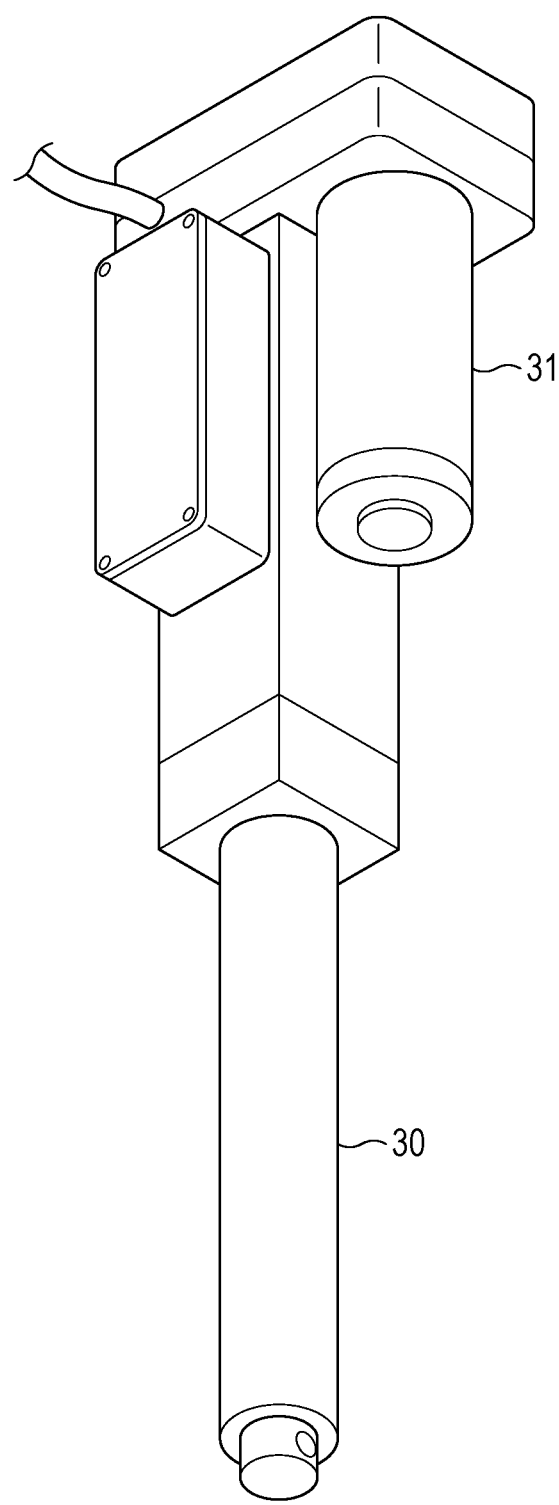
FIG. 3 is a photograph of a motor and a linear actuator of the clutch system.
Figure 4:
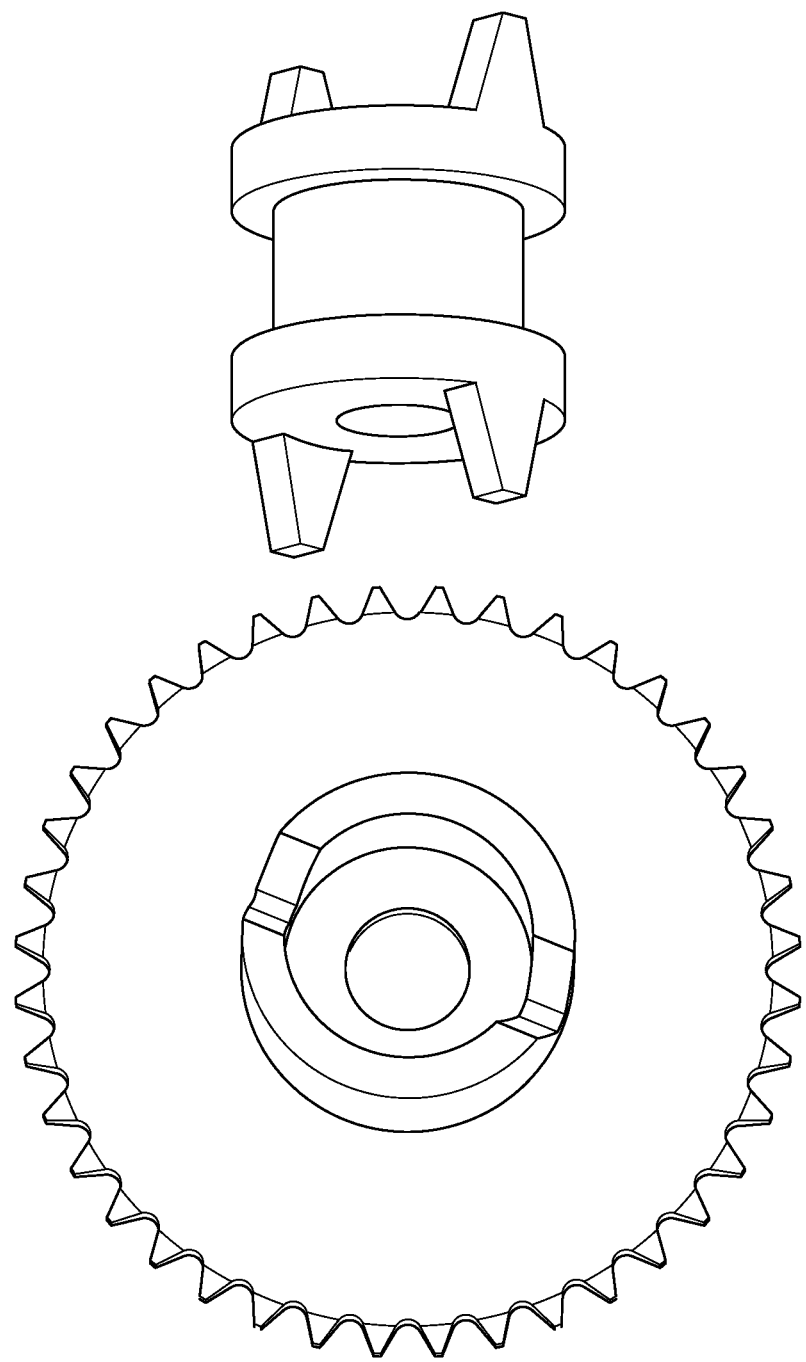
FIG. 4 is a photograph of a clutch sprocket and a self-aligning tooth gear of the clutch system.
Figure 5:
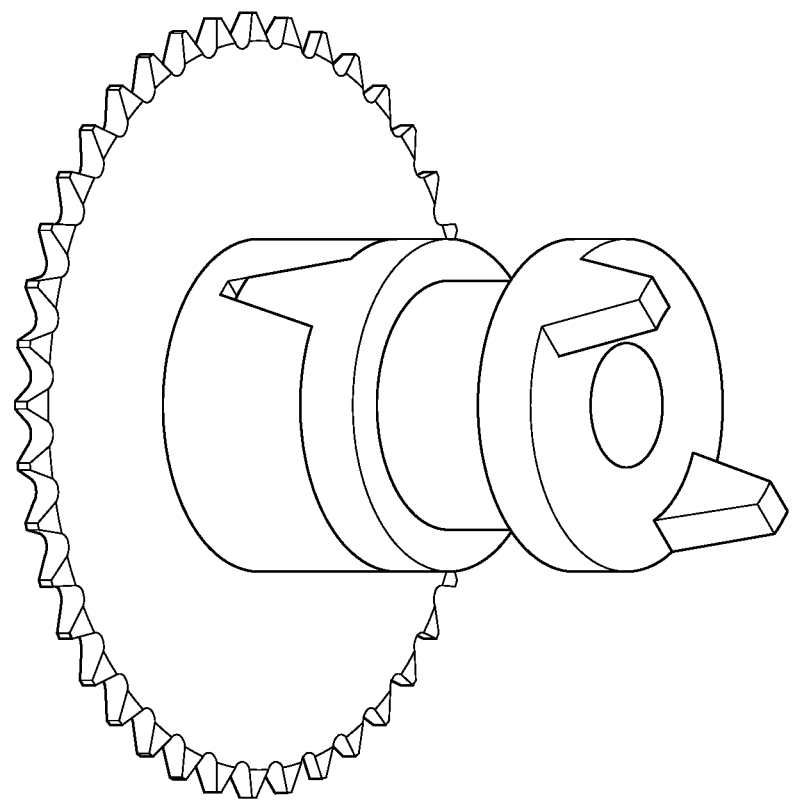
FIG. 5 is a photograph of the sprocket having a clutch and a gear portion, showing the tooth gear partially engaged with the break sprocket portion.

FIG. 3 shows a disconnected linear actuator 30 and motor 31. FIG. 4 shows a disengaged taper tooth gear 26 and drive sprocket 24. FIG. 5 shows an engaged taper tooth gear 26 and drive sprocket 24.

Every other time the knotter ties a 2'×2' bale, the center knotter 11 is energized by the clutch mechanism 10 to also tie the two 2'×2' bales into one 2'×4' foot bale. A twine lever or take-up spool (not shown) is installed on the center twine for a smooth twine feeding with no restrictions. The process does not affect the efficiency of baler.

In operation, the needles of the outside knotters and the outside knotters tie with every rotation of the knotter shaft 12 to tie a 2'×2' bale. The countershaft 20 and drive sprocket 24 cause the center needle and knotter (not shown) to be activated every other time a 2'×2' bale is tied. When the center needle and knotter is activated, the center needle ties twine around two 2'×2' bales causing them to be joined together into a single 2'×4' bale. The 2'×4' bale is eventually pushed out the ejection shoot for collection later. If a user desires, he or she can cut the center twine joining the two 2'×2' bales into the 2'×4' bales so that the 2'×2' bales can be individually handled. However, if a user wishes to retain the 2'×4' bale in its original configuration, then the center twine is left intact and the 2'×4' bale can be manually or mechanically picked up or moved.

Figure 6:
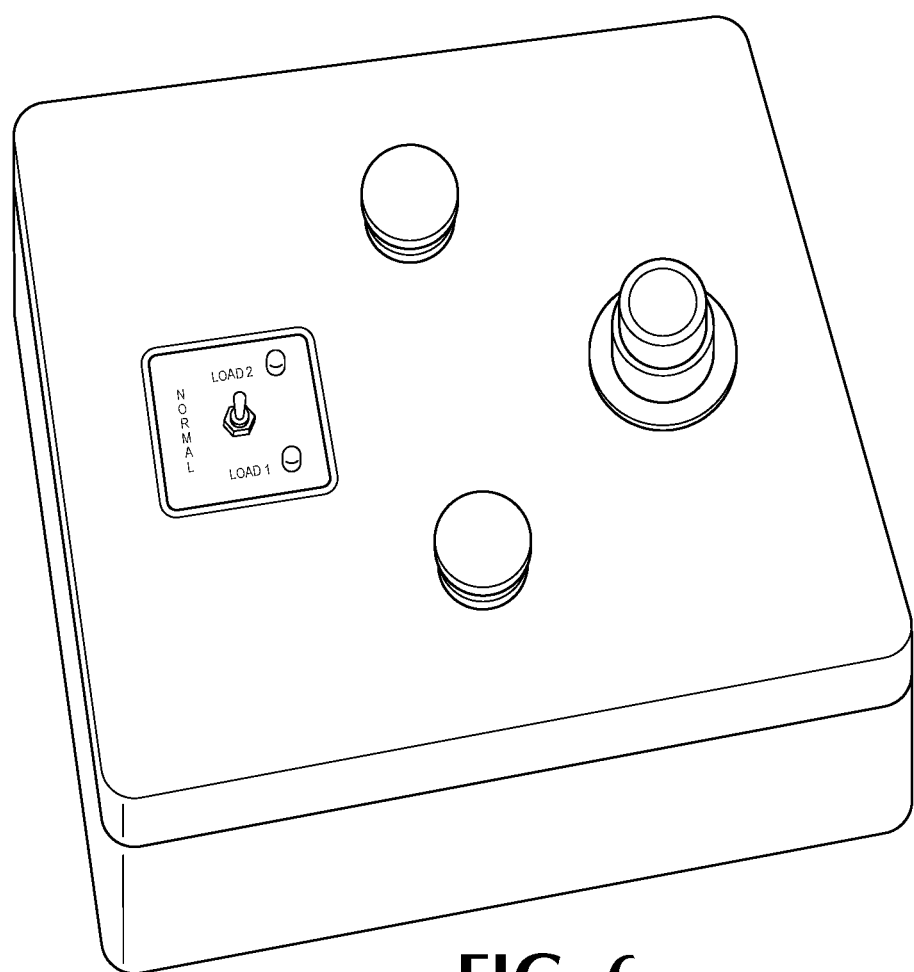
FIG. 6 is the exterior controls of the control box for the clutch system.
Figure 7:
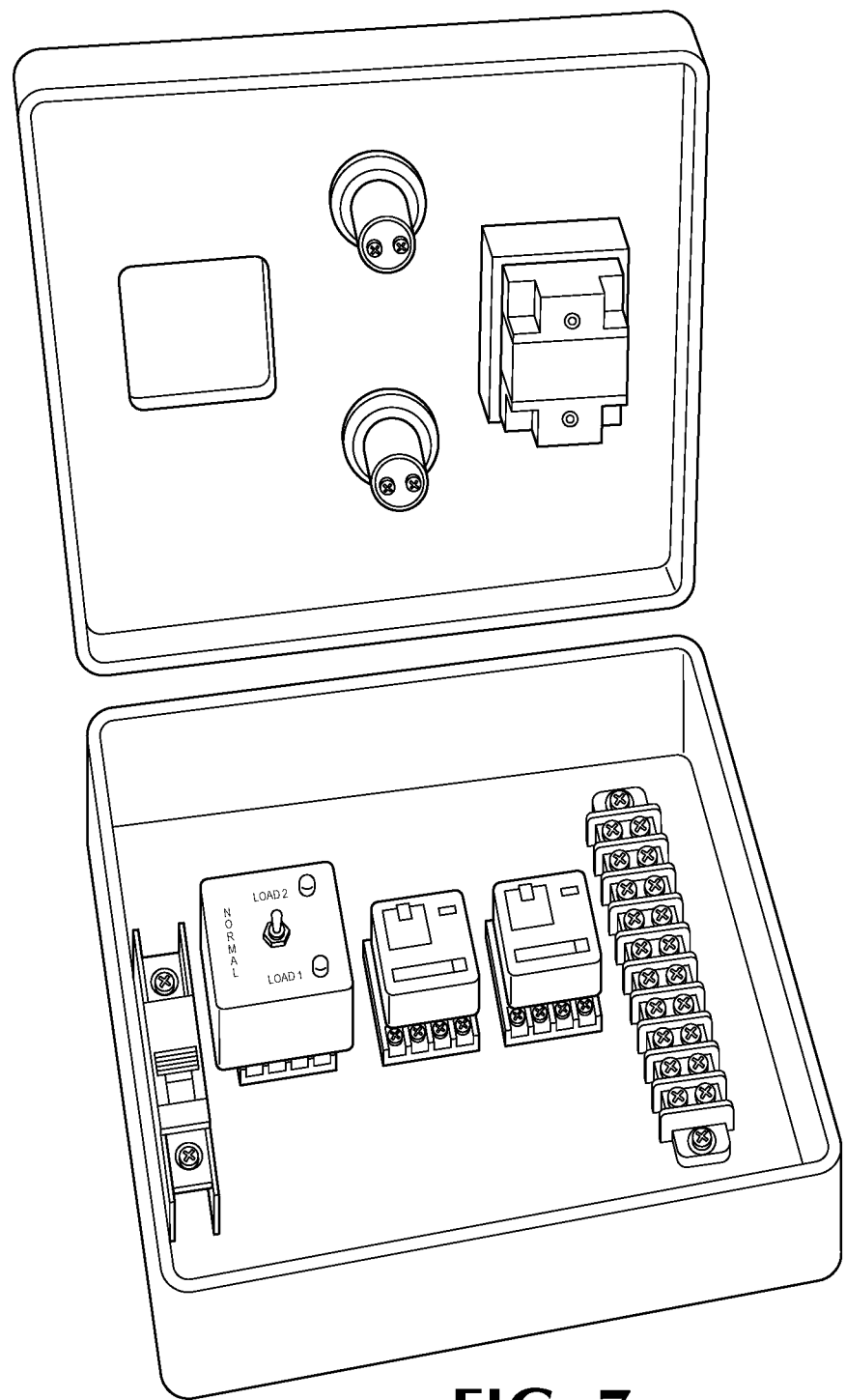
FIG. 7 is the interior controls of the control box for the clutch system.
Figure 8:
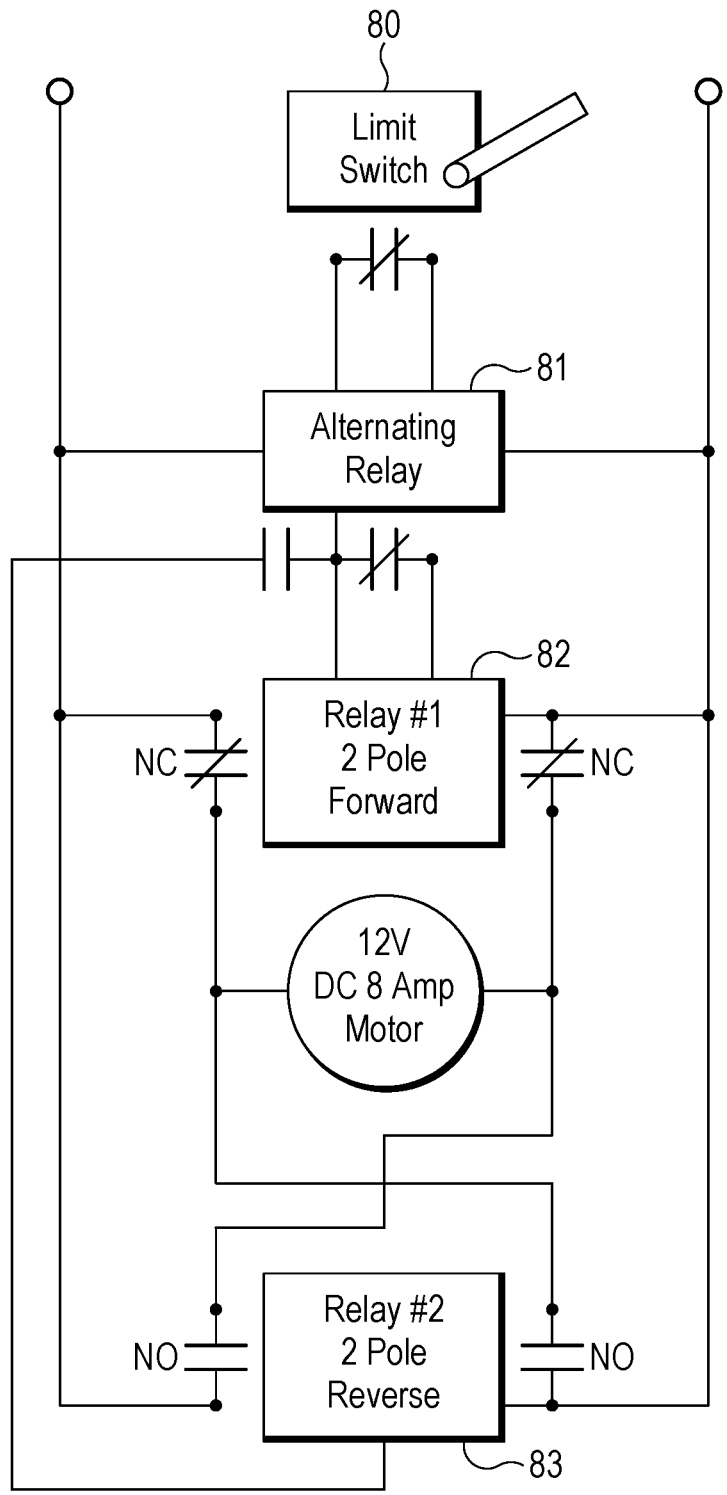
FIG. 8 is a schematic of the controls for the clutch system.

FIG. 6 shows the external controls of the system. FIG. 7 shows in the internal controls. Placement internal or external to a control box is not important to this disclosure. As shown in FIG. 8, limit switch 80 is electrically connected to alternating relay 81. Center needles (not shown) contact limit switch 80 to cause alternating relay 81 to alternate current between forward relay 82 and reverse relay 83, which corresponds to driving linear actuator 30 to move taper tooth gear 26 between a sprocket position 27 and a brake position 28. A time delay of 5-10 seconds built into alternating relay 81 maintains synchronous operation between the center tie and the outside ties.

In an alternate embodiment, the invention is used on a high capacity baler that makes 3 tie 2×4 foot bales, up to 150 pounds. In handling these bales, normally it would be necessary to use all mechanical equipment for pick up out of field, stacking in 4 ton stacked blocks, transporting and unloading at a merchant for resale or at farm or stables, feeding livestock or bedding straw and final destination.

Smaller bales that make a 2 tie bale under 75 pounds, are less ideal capacity and less efficient, as generally these bales are not the shape and size that can be cross tied into a tight stable stack preferable for transporting on the road or storage in larger hay barns.

The 3 tie 2×4 foot baler can be adapted to make two 2×2 foot mini twin bales, which can be pressed together to make a 2×4 foot or used as a 2×2 foot bale. This is accomplished by using the outside twines to make 2×2 foot bales. When the second 2×2 foot bale is tying, the center string would also be tying the two 2×2 foot bale into one 2×4 foot 150 pound bale.

As necessary, the center string on the 2×4 foot bales can be cut, allowing the two 2×2 foot bales to pop out for access for moving about small quantities and feeding.

In a preferred embodiment taper tooth gear has 4 teeth, 2 on each end. The teeth are approximately wedge shape to enhance aligning in corresponding apertures in drive sprocket 24 or brake sprocket 25.

In operation, the linear actuator would move the taper tooth gear approximately 3" to the right engaging the drive sprocket 24 or back 3" to the left engaging the brake sprocket 25. The brake sprocket would be attached solid to countershaft 20 to keep the center knotter in time from rotating when the main shaft and outside knotters are operating.

Embodiments of the present invention can be retrofit on existing balers or constructed as part of a new baler depending on the particular implementation.

In an alternate embodiment, there is provided a drive system for controlling a center knotter of a baler, including an alternating relay capable of being triggered by a trigger switch which is keyed to motion of a baler electrically and where the alternating relay is connected to a linear actuator which drives a taper tooth gear between a drive position and a braked position, where the drive position occurs when drive teeth of the taper tooth gear are engaged with a drive sprocket and braked position occurs when brake teeth of the taper tooth gear are engaged with a brake sprocket; a countershaft on which are mounted the brake sprocket, the drive sprocket, and a center knotter sprocket, where the center knotter sprocket is capable of engaging a center knotter of a baler; where the alternating relay is capable of being triggered by a trigger switch which is keyed to motion of the baler.

In another embodiment, there is provided an agricultural baler, including a drive system for controlling a center knotter of the baler, including: an alternating relay triggered by movement of a needle of the center knotter or an outside knotter where such trigger drives a linear actuator to alternately engage a drive sprocket and a brake sprocket; the drive sprocket capable of driving a countershaft on which is mounted a center knotter sprocket, which center knotter sprocket carries a center knotter chain for driving a center knotter; and the brake sprocket capable of preventing rotation of the countershaft.

In another embodiment, there is disclosed a method of creating double-sized bales from two single-sized bales, the method comprising engaging a three-tie knotter shaft with a center knotter to a countershaft capable of driving the center knotter on every-other rotation of the knotter shaft, where the countershaft rotates by engagement of a drive sprocket and brakes by engagement of a brake sprocket, and, when the countershaft rotates, a center knotter sprocket affixed thereto synchronously rotates to engage a center knotter.

Therefore, the foregoing is considered as illustrative only of the principles of the present invention. Further, since numerous modifications and changes will readily occur to those skilled in the art, it is not desired to limit the present invention to the exact construction and operation described, and accordingly, all suitable modifications and equivalents may be resorted to, falling within the scope of the present invention. While the above Description describes various embodiments, it will be clear that the present invention may be otherwise easily adapted to fit any configuration as desired or required.

As various changes could be made in the above embodiments without departing from the scope of the invention, it is intended that all matter contained in the above Description shall be interpreted as illustrative and not in a limiting sense.

What is claimed is:

1. A drive system for controlling a center knotter of a baler, the drive system comprising:
   a trigger switch is keyed to a motion of the baler electrically;
   an alternating relay configured to be triggered by the trigger switch;
   a taper tooth gear having drive teeth and brake teeth;
   a countershaft;
   a linear actuator connected to the alternating relay;
   a drive sprocket mounted on the countershaft;
   a center knotter sprocket mounted on the countershaft; and
   a brake sprocket mounted on the countershaft,
   wherein the linear actuator is configured to slide the taper tooth gear between a drive position and a braked position, where the drive position occurs when the drive teeth of the taper tooth gear are engaged with the drive sprocket and the braked position occurs when the brake teeth of the taper tooth gear are engaged with the brake sprocket, and wherein the center knotter sprocket is configured to engage the center knotter of the baler.

* * * * *